United States Patent [19]
Fukuda

[11] Patent Number: 5,946,305
[45] Date of Patent: Aug. 31, 1999

[54] CORDLESS TELEPHONE SYSTEM

[75] Inventor: Kunio Fukuda, Tokyo, Japan

[73] Assignee: Sony Corporation, Tokyo, Japan

[21] Appl. No.: 08/570,263

[22] Filed: Dec. 11, 1995

[30] Foreign Application Priority Data

Dec. 13, 1994 [JP] Japan .................................. 6-309158

[51] Int. Cl.$^6$ ...................................................... H04J 3/00
[52] U.S. Cl. .............................. 370/280; 370/1; 370/337; 370/515
[58] Field of Search ..................... 455/434, 450, 455/466, 509, 511, 515, 517; 375/200, 357, 367; 370/280, 319, 321, 337, 347, 350, 515

[56] References Cited

U.S. PATENT DOCUMENTS

| | | | |
|---|---|---|---|
| 4,679,225 | 7/1987 | Higashiyama | 379/62 |
| 4,837,802 | 6/1989 | Higashiyama et al. | 379/62 |
| 4,864,588 | 9/1989 | Simpson et al. | 375/367 |
| 5,199,049 | 3/1993 | Wilson . | |
| 5,247,702 | 9/1993 | Su | 455/509 |
| 5,446,756 | 8/1995 | Mallinckrodt | 375/200 |
| 5,663,716 | 9/1997 | Miwa et al. | 340/825.04 |

FOREIGN PATENT DOCUMENTS

| | | |
|---|---|---|
| 2249922 | 5/1992 | United Kingdom . |
| WO93/09493 | 5/1993 | WIPO . |

*Primary Examiner*—Chau Nguyen
*Assistant Examiner*—Kenneth Vanderpuye
*Attorney, Agent, or Firm*—Jay H. Maioli

[57] ABSTRACT

A digital cordless telephone system can prevent control signals transmitted from a plurality of base stations from interfering with each other In a digital cordless telephone system wherein a communication signal is transmitted among it and terminal stations by transmitting digital data through a predetermined channel and a communication among it and the terminal stations is controlled by a control channel different from the predetermined channel, data in a slot arrangement is used as a control signal, the control signal of the slot arrangement is intermittently transmitted at a constant interval, and a transmission at every constant interval is randomly extinguished.

12 Claims, 9 Drawing Sheets

FIG. 1
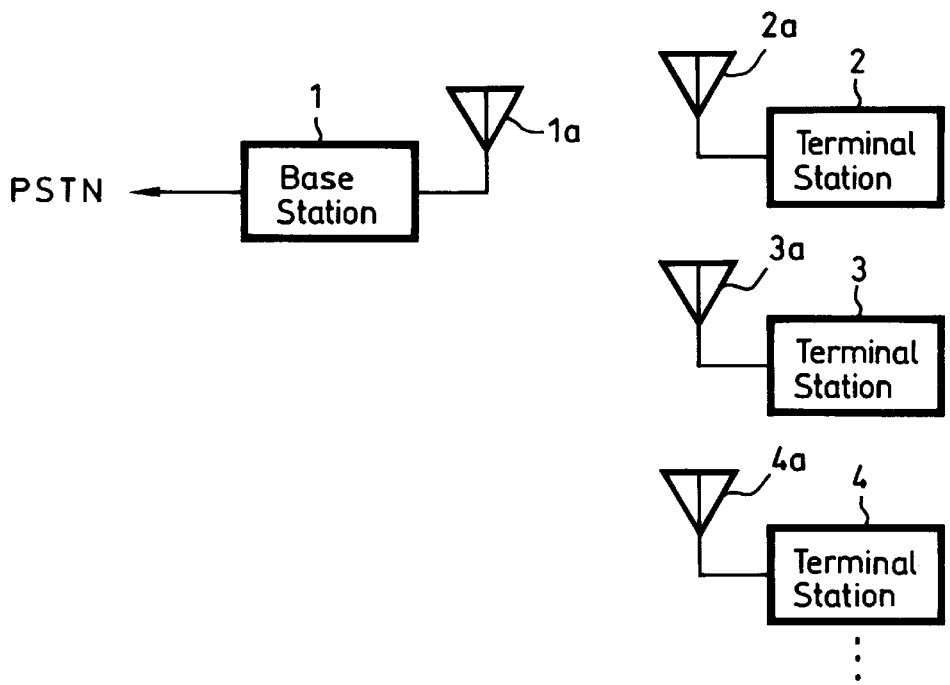
FIG. 2A  TDD System
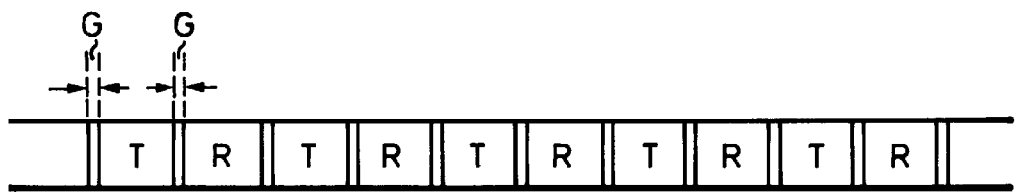
FIG. 2B  TDMA System
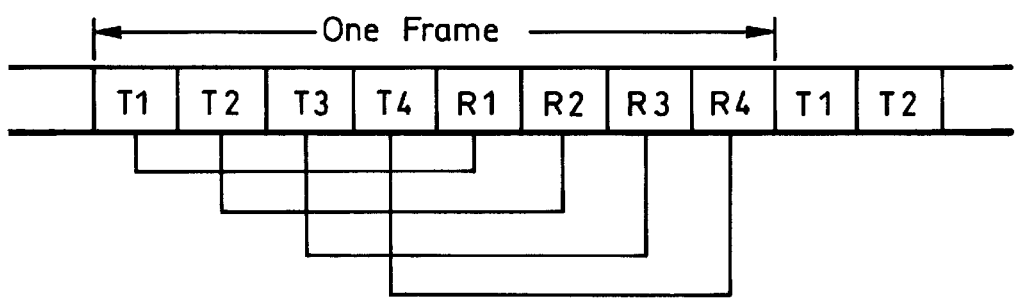

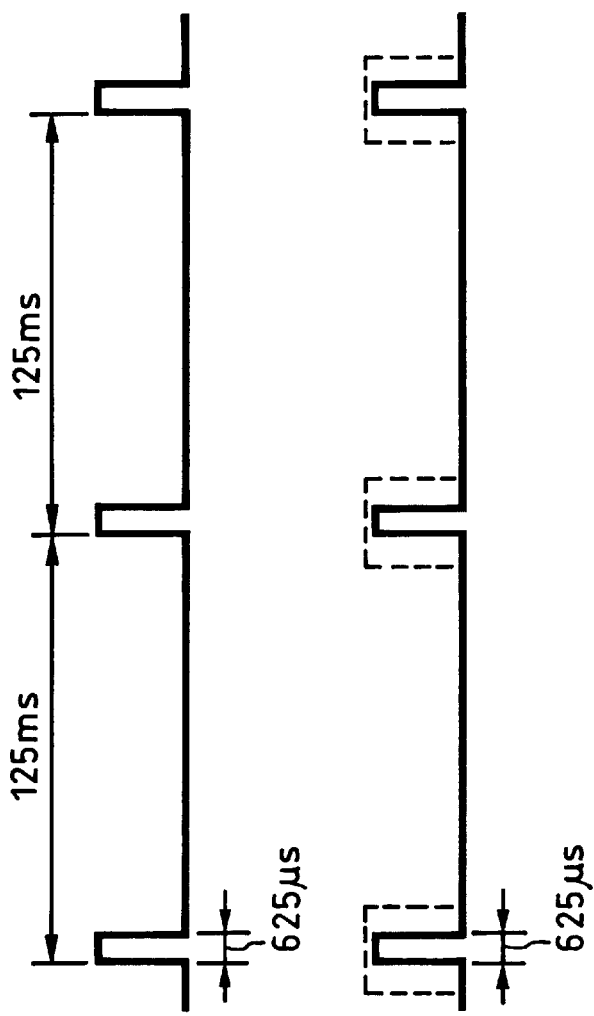

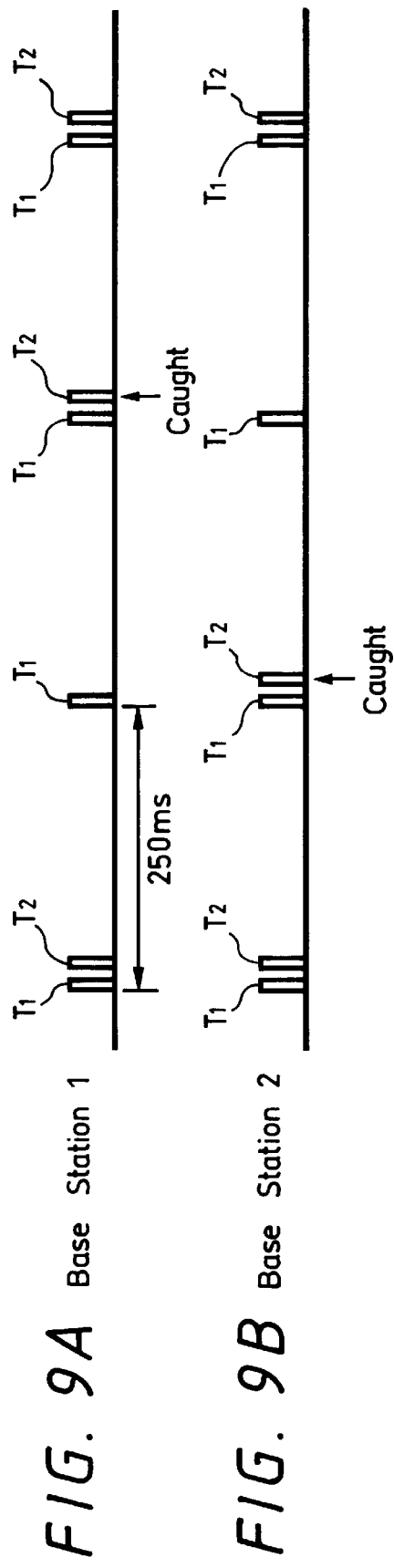

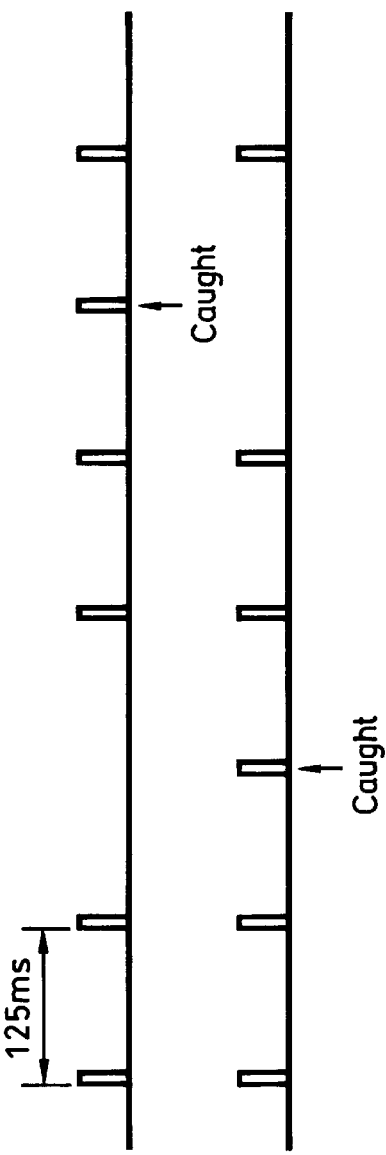

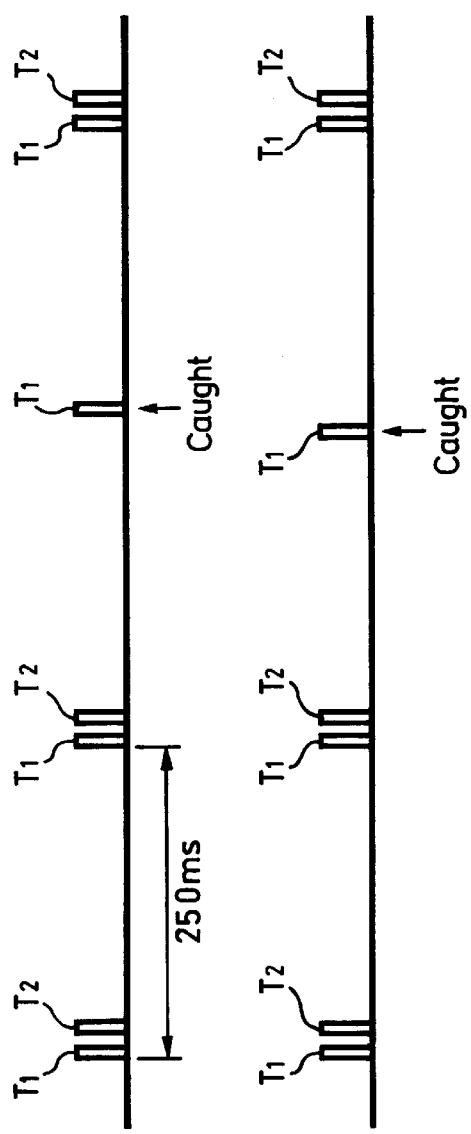

CORDLESS TELEPHONE SYSTEM

BACKGROUND OF THE INVENTION

The present invention relates to a digital cordless telephone system, such as a PHS (personal handy phone system) in Japan and a DECT (digital European cordless telecommunications), for communicating between a base station and a terminal station by transmitting and receiving digital data and, more particularly to a base station of a digital cordless telephone system.

FIG. 1 of the accompanying drawings shows a digital cordless telephone system in block form As shown in FIG. 1, a base station 1 is connected to a PSTN (public switched telephone network) and includes an antenna 1a for making a communication between it and a terminal station. There are prepared a plurality of, e.g., three terminal stations 2, 3, 4 which are capable of communicating with the base station 1. Antennas 2a, 3a, 4a are attached to the terminal stations 2, 3, 4 and digital data is transmitted and received between the antenna 1a of the base station 1 and the antennas 2a, 3a, 4a of the terminal stations 2, 3, 4 via radio waves.

When each of the terminal stations 2, 3, 4 communicates with the base station 1 (or the called party connected to the base station 1 via the PSTN), the terminal station transmits a connection control signal of a predetermined format to the base station 1 and communicates with the base station 1 by transmitting audio data converted in the form of time-division digital data.

The digital cordless telephone system uses a TDD (time division duplex) system in which a transmission frequency and a reception frequency are the same. Also, the digital cordless telephone system uses a TDMA (time division multiple access) system for transmitting a plurality of communication signals at the same frequency during different periods.

Specifically, in the case of the TDD system, as shown in FIG. 2A, one channel (frequency) is divided into a transmission slot T and a reception slot R from a time standpoint and these transmission and reception slots T, R are repeated alternately. Moreover, a guard time G is provided between these slots T and R. A duration of each of the slots T and R is selected to be 1 millisecond and a duration of the guard time G is selected to be several 10s of microseconds In the portable telephone (terminal station), the transmission slot T communicates with the base station (master station) and the reception slot R receives audio data from the base station.

In the case of the TDMA system, as shown in FIG. 2B, the transmission slot T and the reception slot R disposed within one channel are used only one time during several periods in order to communicate the single terminal station and the base station. Other transmission slots T and reception slots R disposed within the same channel are used in order to communicate between other terminal stations and the base station. Thus, digital data is multiplexed in order to allow communication among a plurality of communication apparatus on one channel.

Since audio data is multiplexed as described above, the frequency band prepared for the cordless telephone can be used efficiently. When such communication is carried out, a control signal is transmitted from the base station to each terminal station by transmitting the control signal on a slot arrangement at a predetermined period on a different channel (control channel) from the transmission and reception channels of the communication signal. Specifically, as shown in FIG. 3A, the base station repeatedly transmits a control signal with slot of 625 microseconds at the period of 125 milliseconds. The reason that the control signal is transmitted at the period of 125 milliseconds is that the control signal is transmitted 8 times per second according to the standards of this kind of digital cordless telephone. When the control signal is transmitted 8 times per second at an equal interval the period becomes 125 milliseconds.

Each terminal station can discriminate control information indicative of assignment of slots used in transmission and reception by receiving the transmitted control signal. A communication between the base station and the terminal station becomes possible by use of the slots designated by the control information. When each terminal station is called by an incoming call or incoming call extension, the base station transmits control information indicative of the terminal station called by the incoming call or incoming extension by the control signal. Accordingly, each terminal station has to receive the control signal constantly even when placed in the reception standby mode. In this case, however, from a standpoint of power consumption in the reception standby mode, it is unnecessary for the terminal station to receive all control signals transmitted from the base station at the interval of 125 milliseconds when placed in the reception standby mode. Accordingly, in actual practice, each terminal station intermittently receives the control signal once per several seconds.

If a plurality of systems are located in the areas close to each other, there is then the possibility that control signals transmitted from the respective base stations will interfere with each other, thereby making it impossible for the terminal stations of the respective system to receive the control signals.

Specifically, let it be assumed that two base stations of the cordless telephone systems where the transmitted states of the control signals are the same are located at the places comparatively close to each other (e.g., within a range of 100 m). Also let it be assumed that the transmission timings of the control signals from the two base stations are almost agreed with each other as shown in FIGS. 3A and 3B. At that time, a terminal station located in the area being capable of receiving the control signals transmitted from the two base stations are urged to receive the control signals from the two base stations at the same time. As a result, this terminal station cannot accurately discriminate data contained in the control signal of each slot. If the terminal station becomes unable to discriminate the control signal, then such terminal station becomes unable to set a communication between it and the base station. Thus, the digital cordless telephone system cannot be used as the cordless telephone.

In actual practice, even though the transmission timings of the control signals of one slot of 625 microseconds are not completely synchronous, if the control signal is transmitted from one base station at a timing overlapping a little of the leading or trailing edge of the other control signal (control signal shown in FIG. 3A) as shown by phantoms in FIG. 3B, there is then the large possibility that the control signal will not be received by the terminal station.

Assuming now that a frequency difference of clocks for determining timings at which the two base stations transmit control signals is 5 ppm, then the transmission timing of the control signal is shifted by 5 microseconds per second. If the transmission timings of the two control signals start overlapping at a certain time, then the control signals interfere with each other over 375 seconds because $625 \times 3/5 = 375$. As a consequence, the terminal station cannot receive an incoming call and cannot make an outgoing call during a time period of 375 seconds.

SUMMARY OF THE INVENTION

In view of these problems, it is an object of the present invention to provide a cordless telephone system in which control signals transmitted from a plurality of base stations can be prevented from interfering with each other.

According to a first aspect of the present invention, there is provided a base station of a digital communication system which comprises radio frequency processing means for processing an RF signal for transmitting and/or receiving digital data and communication control means for controlling a communication to one or more terminal stations using a control channel, wherein the communication control means makes a control signal which has periodic pulses and some of the periodic pulses are randomly extinguished.

According to a second aspect of the present invention, there is provided a terminal station of a digital communication system which comprises radio frequency means for receiving an RF signal and synchronizing means for synchronizing a signal with a received RF signal from a base station, wherein the synchronizing means synchronizes a signal supplied thereto from said base station if the synchronizing means catches a synchronizing signal from the base station and executes another process if the synchronizing means does not catch the synchronizing signal from the base station.

According to a third aspect of the present invention, there is provided a digital communication system which comprises a base station and one or more terminal stations, wherein the communication system uses a control signal which has periodic pulses and some of the pulses are randomly extinguished.

In accordance with a fourth aspect of the present invention, there is provided a method for receiving a control signal which comprises the steps of receiving a first control signal in a first manner, receiving a second control signal if the first control signal has not yet been received and receiving the first or second control signal in a second manner if the second control signal has not yet been received.

In accordance with a fifth aspect of the present invention, there is provided a method for sending a control signal from a base station of a digital communication system which comprises the steps of making a control signal having periodic pulses, some of which are randomly extinguished and transmitting an RF signal modulated by at least the control signal made from the control signal making step.

BRIEF DESCRIPTION OF THE DRAWINGS

FIG. 1 is a schematic block diagram showing a cordless telephone system;

FIGS. 2A and 2B are schematic diagrams showing communication systems of a cordless telephone system;

FIGS. 3A and 3B are timing charts showing a manner in which control signals are transmitted;

FIGS. 9A and 9B are timing charts showing a manner in which control signals are transmitted from a plurality of base stations according to an embodiment of the present invention;

FIGS. 10A and 10B are timing charts showing a manner in which control signals are transmitted from a plurality of base stations according to another embodiment of the present invention; and FIGS. 11A and 11B are timing charts showing a manner in which control signals are transmitted from a plurality of base stations according to a further embodiment of the present invention.

DETAILED DESCRIPTION OF THE PREFERRED EMBODIMENTS

A digital cordless telephone system according to a first embodiment of the present invention will hereinafter be described with reference to FIGS. 4 to 9.

Figure 4:
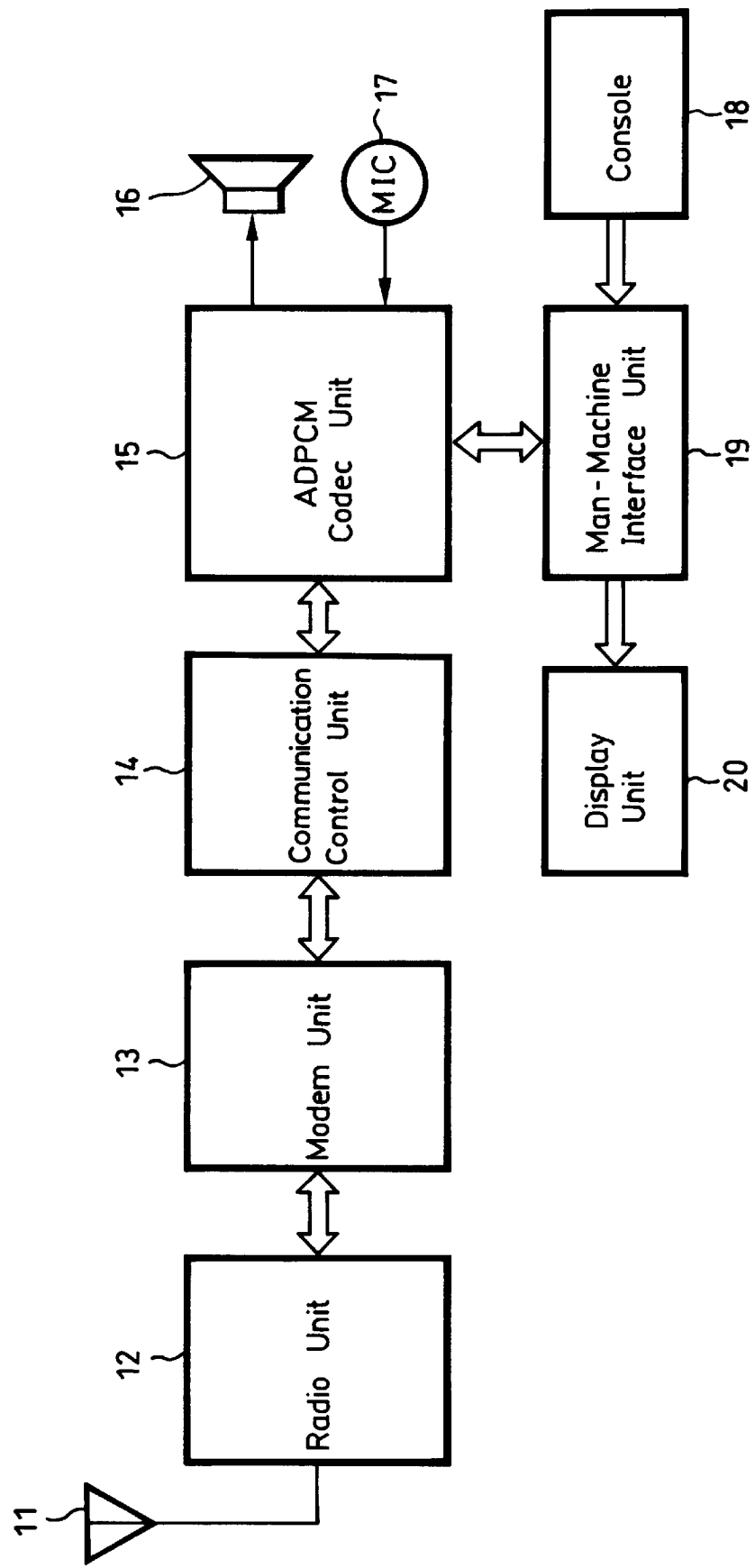
FIG. 4 is a schematic block diagram showing a terminal station according to an embodiment of the present invention.

FIG. 4 shows a terminal station of a TDMA type cordless telephone system. As shown in FIG. 4, data received at an antenna 11 from a base station or other terminal station is received by a radio unit 12 and supplied to a modem (modulator/demodulator) unit 13 which demodulates received data. The received data thus demodulated by the modem unit 13 is supplied through a communication control unit 14 to an ADPCM (adaptive differential pulse code modulation) codec unit 15, in which received ADPCH digital data is converted to an analog audio signal. This analog audio signal is output from a speaker 16.

An audio signal picked up by a microphone (MIC) 17 is supplied to the ADPCH codec unit 15, in which it is converted to ADPCM digital data. This ADPCM digital data is supplied through the communication control unit 14 to the modem unit 13, in which it is modulated into transmission data. The modulated transmission data is transmitted from the antenna 11 connected to the radio unit 12.

A console 18 is connected through a man-machine interface unit 19 to the ADPCM codec unit 15, whereby operation information from the console 18 is supplied to the communication control unit 14 side. A display unit 20 is connected to the man-machine interface unit 19 in order to display various states of the terminal stations such as an operation state.

The communication control unit 14 controls a receiving operation either for receiving only a control signal transmitted through a predetermined control channel from the base station at a predetermined interval or for receiving both the control signal from the base station at the predetermined interval and a direct connection request signal directly transmitted from another terminal station at a predetermined interval when the terminal station is placed in the reception standby mode. A manner in which the reception operation is switched when the terminal station is placed in the reception standby mode will be described later on.

Then, the communication control unit 14 discriminates the content of the received control signal. If it is determined by the communication control unit 14 that the terminal station is called by the connection request signal contained in the control signal, then the communication control unit 14 places this terminal station in the corresponding operation mode. Other terminal stations are called by the connection request signal transmitted from the base station in order to make a communication between it and the base station for making an extension call or making an outgoing call or answering an incoming call or in order to make a communication between it and another terminal station for extension call.

Each terminal station transmits an audio signal in order to answer an incoming call or make an outgoing call or to make an extension call terminal station transmits the connection request signal to the base station by use of a control channel under control of the communication control unit 14. The timing at which the connection request signal is transmitted is set so as not to overlap the timing at which the control signal is transmitted from the base station.

Figure 5:
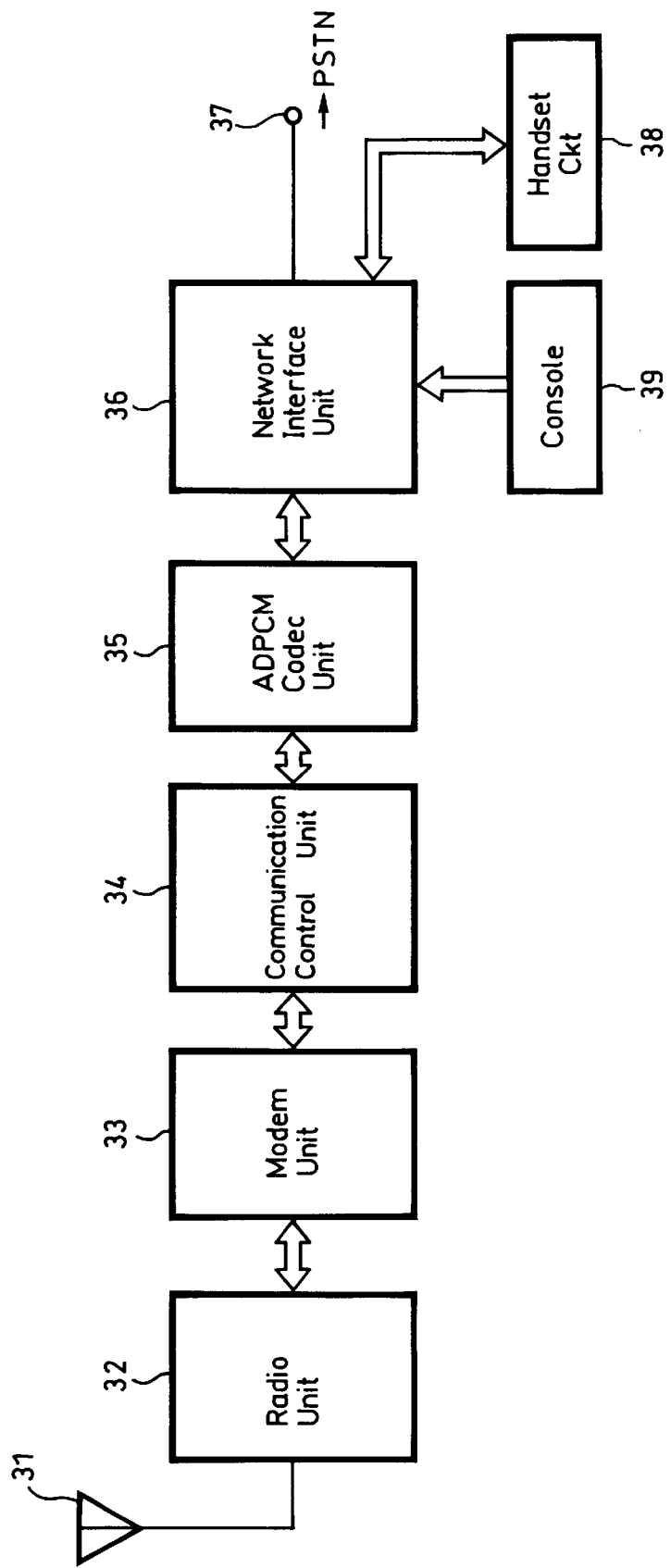
FIG. 5 is a schematic block diagram showing a base station according to the embodiment of the present invention.

FIG. 5 shows a base station. Similarly to the terminal stations, data received at an antenna 31 from the terminal station is received by a radio unit 32 and supplied to a MODEM unit 33 which demodulates received data. The received data thus demodulated is supplied through a communication control unit 34 to an ADPCM codec unit 35, in which received ADPCM digital data is converted into an analog audio signal. This analog audio signal is supplied to a network interface unit 36, from which it is transmitted to a connection terminal 37 connected to the PSTN.

An analog audio signal from the analog telephone network connection terminal 37 is supplied through the network interface unit 36 to the ADPCH codec unit 15, in which it is converted into ADPCM digital data. This digital data is supplied through the communication control unit 34 to the modem unit 33, in which it is modulated into transmission data. The modulated transmission data is transmitted from the antenna 31 connected to the radio unit 32 via radio waves.

A handset circuit 38 is directly connected to the network interface unit 36 so as to enable the user to communicate with the called party through the analog telephone network connection terminal 37. Also, the handset circuit 38 is connected through the network interface unit 36 to the ADPCM codec unit 35 so as to enable the base station to communicate with the terminal station via extension. Further, a console 39 is connected to the network interface unit 36 to thereby perform a variety of control operations, such as making an outgoing call.

The communication control unit 34 of the base station can transmit a control signal periodically under a predetermined state by use of a channel (frequency band) reserved for transmitting a control signal. Another terminal station is called by this control signal. The communication control unit 34 detects whether or not other terminal station transmitted a connection request signal for making a communication between terminal stations. When the user wishes to make a call between the terminal station and the base station by this connection request signal, the base station instructs via a communication channel to the terminal station a control signal to start a communication for making a call between it and the base station.

Figure 6:
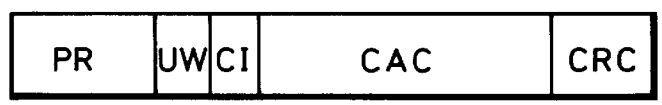
FIG. 6 is a schematic diagram showing a slot of a control signal according to the present invention.

The control signal transmitted from the base station of this embodiment has a slot with a duration of 625 microseconds and has a format shown in FIG. 6. Specifically, as shown in FIG. 6, the control signal is composed of a preamble PR with a constant pattern of a predetermined duration, a unique word UW with a specific pattern indicative of a control signal, a channel type CI for making a communication, control data CAC indicative of control content and an error-detection parity CRC, in that order.

According to this embodiment, the control signal of which a slot is arranged as described above is transmitted in the state shown in FIG. 7. Specifically, after the control signal whose one slot has a duration of 625 microseconds has been transmitted at a predetermined timing $T_1$, a control signal of the next slot is transmitted at a timing $T_2$ delayed from the above transmission start timing by 5 milliseconds.

A transmission at the timing $T_1$ and a transmission at the timing $T_2$ are repeated at the period of 250 milliseconds. Further, according to this embodiment, a transmission of the control signal at the timing $T_2$ is randomly stopped and extinguished. A timing at which the transmission at the timing $T_2$ is extinguished is determined based on a random number generated from a microcomputer (not shown) disposed within the communication control unit 34 of the base station, for example. A transmission of the control signal at the timing $T_1$ is carried out at the period of 250 milliseconds without fail.

A manner in which the control signal is received under the condition that each terminal station is placed in the reception standby mode for being called by the base station or other terminal station will be described with reference to a flowchart of FIG. 8. The terminal station is placed in the reception standby mode when the power switch of the corresponding terminal station is turned on or when a telephone call (extension call or incoming call) at this terminal station is ended.

Figure 8:
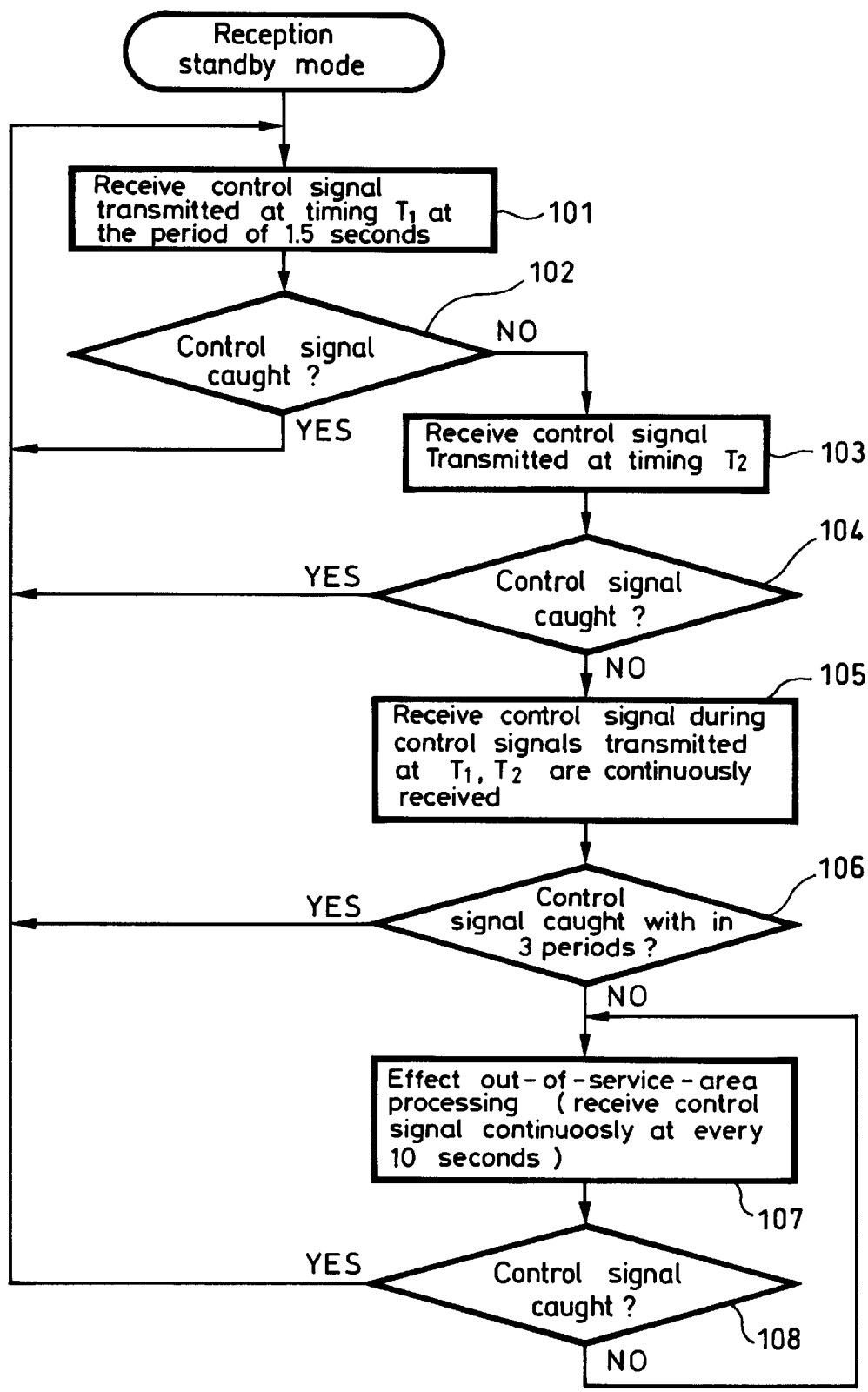
FIG. 8 is a flowchart showing a processing executed under the condition that the terminal station is placed in the standby state.

As shown in FIG. 8, when the terminal station is placed in the reception standby mode, the processing proceeds to the next step 101, whereat a control signal intermittently transmitted from the base station is intermittently received and caught at the period of 1.5 seconds under control of the communication control unit 14 of the terminal station. In this case, initially, the control channel is continuously received during a predetermined period to thereby catch the control signal transmitted at the timing $T_1$, of the period of 250 milliseconds. Then, the terminal station receives the control signal intermittently at the period of 1.5 seconds based on the timing at which the above control signal is caught.

It is determined at the next decision step 102 whether or not the control signal is caught when the control signal is intermittently received at the period of 1.5 seconds. If the control signal is caught as represented by a YES at decision step 102, then the processing returns to step 101, whereat the control signal is intermittently received at the period of 1.5 seconds. If the control signal is not received as represented by a NO at decision step 102, then the processing proceeds to step 103, whereat the control signal at the timing $T_2$ transmitted after 5 milliseconds of the timing $T_1$ is received. It is determined in the next decision step 104 whether or not the control signal at the timing $T_2$ is caught If this control signal at the timing $T_2$ is caught as represented by a YES at decision step 104, then the processing returns to step 101, whereat the control signal is intermittently received at the period of 1.5 seconds on the basis of the timing at which the control signal transmitted at the timing $T_1$ is caught.

If on the other hand the control signal is not caught as represented by a NO at decision step 104, then the processing proceeds to step 105, whereat the control channel is received continuously. Then, it is determined in the next decision step 106 whether or not the control signal is caught during a time period (i.e., about 750 milliseconds) corresponding to three periods of the transmission period of the control signal when the control channel is received continuously. If the control signal is caught as represented by a YES at decision step 106, then the processing returns to step 101, whereat the control signal is intermittently received at the period of 1.5 seconds on the basis of the timing at which the control signal transmitted at the timing $T_1$ is caught.

If on the other hand the control signal is not caught even when the control channel is continuously received during the time period of three periods, then it is determined that the terminal station is located at the position where the terminal station cannot receive the control signal from the base station. Then, the processing proceeds to step 107, whereat a processing provided when the terminal station is placed outside of the service area is executed (hereinafter this processing will be referred to as "out-of-service-area processing" for simplicity). In this out-of-service-area processing, the control channel is intermittently received every 10 seconds during a time period of 510 milliseconds. It is determined at the next decision step 108 whether or not the control signal is caught while the control channel is intermittently received at every 10 seconds during a time period of 510 milliseconds. If the control signal is caught as represented by a YES at decision step 108, then the processing returns to step 101, whereat the control signal is intermittently received at the period of 1.5 seconds on the basis of the timing at which the control signal transmitted at the timing $T_1$ is caught. If on the other hand the control signal is not caught as represented by a NO at decision step 108, then the processing returns to step 107, whereat the out-of-service-area processing is carried out, i.e., the intermittent reception of the control signal at every 10 seconds is repeated.

A processing in a standby mode is executed under control of the communication control unit 14 of the terminal station as described above. When the corresponding terminal station is called by the control signal caught at any stage, such terminal station transmits and receives slot data between it and the base station by use of the slot indicated by the control signal.

When the control signal is caught by the processing executed in accordance with the flowchart of FIG. 8, the control signal transmitted from the base station of the same system with a system code common to that of the terminal station is caught. Therefore, a control signal transmitted from a base station with a different system code is ignored even though received.

Figure 7:
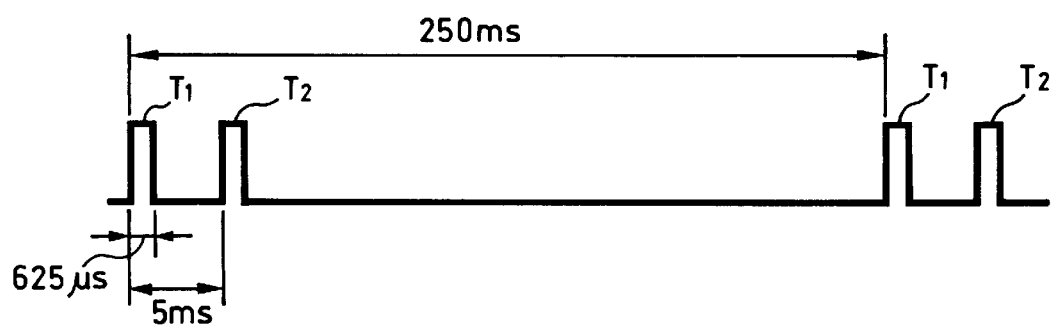
FIG. 7 is a timing chart showing a manner in which a control signal is transmitted.

In this way, each terminal station receives the control signal transmitted from the base station as shown in FIG. 7 to thereby catch the control signal satisfactorily. If the control signal is not caught, then the reception processing is automatically switched to the out-of-service-area processing. Therefore, the terminal station can be placed in the standby mode for satisfactorily receiving a control signal regardless of the location where the terminal station is placed. According to this embodiment, if the control signal transmitted at the timing $T_2$ as shown in FIG. 7 is randomly extinguished, there is then the small possibility that the control signal from the base station will interfere with a control signal transmitted from another base station. There is the large possibility that each terminal station can receive the control signal satisfactorily.

Specifically, as shown in FIGS. 9A and 9B, for example, let it be assumed that two base stations 1 and 2 whose control signal transmission timings $T_1$ and $T_2$ are substantially the same are located comparatively close to each other. A transmission of a control signal transmitted from one base station 1 as shown in FIG. 9A is stopped at the transmission timing $T_2$. At that time, a control signal transmitted from another base station 2 at the timing $T_2$ as shown in FIG. 9B can be caught by a terminal station with the same system code as that of this base station 2 (at the timing shown by an arrow in FIG. 9A). Similarly, let it also be assumed that a transmission of a control signal transmitted from another base station 2 at the timing $T_2$ is stopped at another timing. Then, at that time, the control signal transmitted from one base station 1 at the timing $T_2$ as shown in FIG. 9A can be caught by a terminal station with the same system code as that of the base station 1 (timing shown by an arrow in FIG. 9A).

Therefore, according to this embodiment, even when the transmission periods of the control signals from a plurality of base stations are synchronous with each other, there exist timings at which the control signal can be caught by the terminal station with the result that a period in which a communication control (control of an outgoing call from the terminal station or control of an incoming call to the terminal station) is disabled can be reduced. Therefore, a communication can be prevented from being disabled during a long period of time. To be concrete, if control signals interfere with each other under the condition that each terminal station is placed in the reception standby mode, then the control signal cannot be caught at the timing $T_1$ at step 101 shown in FIG. 8. In this case, however, there is the large possibility that the control signal will be caught at step 103 shown in FIG. 8 or that the control signal will be caught when the control channel is being continuously received at step 105 shown in FIG. 8. In the worst case, there is the large possibility that, after the processing proceeds to the out-of-service-area processing, the processing will be returned to the ordinary processing at the relatively early stage.

According to the present invention, a time period in which the control signal cannot be caught can be reduced considerably as compared with the case that the control signal cannot be caught by each terminal station until the interference of the control signals from a plurality of base stations is removed.

A possibility that the control signal will be caught will be described with reference to the following equations. Assuming now that Pt is a probability with which the control signal is transmitted at the timing $T_2$, then a probability $P_1$ at which control signals interfere with each other at the timing $T_2$ presented when the control signal transmission timings of the two base stations overlap with each other is expressed by the following equation (1)):

$$P_1 = (1-Pt)^2 + Pt^2 \qquad (1)$$

A probability $P_3$ at which the control signals interfere with each other three times successively is expressed by the following equation (2):

$$P_3 = [(1-Pt)^2 + Pt^2]^3 \qquad (2)$$

Since the processing proceeds to the out-of-service-area processing when the control signals interfere with each other three times successively, $P_3$ represents the probability at which the processing proceeds to the out-of-service-area processing. For example, when Pt=½, $P_3$=⅛. Therefore, the probability $P_3$ at which the processing proceeds to the out-of-service-area processing can be decreased sufficiently.

In accordance with this embodiment, since a transmission of the control signal at one timing $T_1$ is constantly carried out at every period, if the control signals from a plurality of base stations do not interfere at all, then each terminal station can reliably receive and catch the control signal by catching the control signal based on the timing $T_1$. Therefore, even when the transmission of the control signal is extinguished, it is avoided where the control signal cannot be caught. Thus, the terminal station can receive the control signal stably.

While the control signals are periodically transmitted twice at the close timings $T_1$, $T_2$ as described above, the present invention is not limited thereto and a control signal transmitted in another state may be extinguished randomly. As shown in FIG. 10A, for example, the control signal may be transmitted at a constant period (at the interval of 125 milliseconds) and a transmission of the control signal may be stopped at an arbitrary timing and then the control signal may be extinguished. With this arrangement, even when the transmission periods of the control signals from the two base stations 1 and 2 shown in FIGS. 10A and 10B are synchronous with each other, the control signal transmitted from another base station 2 can be caught at the timing where a transmission of the control signal from one base station 1 is extinguished.

While the transmission of the control signal at the succeeding timing $T_2$ is extinguished randomly when the control signals are periodically transmitted twice at the close timings $T_1$ and $T_2$, a principle of the present invention can be applied to the case that a transmission of the control signal at the preceding timing $T_1$ is extinguished randomly.

Further, the control signal may be transmitted three times or more during one period.

Furthermore, it is possible to randomly combine the case that the transmission of the control signal at the preceding timing $T_1$ is extinguished and the case that the transmission of the control signal at the succeeding timing $T_2$. By way of example, the transmission of the control signal from one base station 1 shown in FIG. 11A is extinguished at a timing $T_1$ randomly set and the transmission of the control signal from another base station 2 shown in FIG. 11B is extinguished at a timing $T_2$ randomly set. At that time, even when the extinguished timings $T_1$ and $T_2$ are located within the same period, the control signals transmitted from the two base stations 1 and 2 during one period can be prevented from interfering with each other. Therefore, the control signals can be received satisfactorily by the terminal stations of the respective system.

While the present invention is applied to the case wherein the control signal is transmitted from the base station paired with the terminal stations as the digital cordless telephone system as described above, a principle of the present invention can also be applied to the case wherein a control signal is transmitted from a public base station located outdoors to communicate with a large number of terminal stations.

Furthermore, while numerical values such as the period are presented by way of example, the present invention is not limited thereto and other timing or the like can be set freely.

According to the present invention, even when the control signals from a plurality of base stations are transmitted at the same timing, only the control signal from one base station can be received at the timing wherein the transmission of the control signal is extinguished. There is then the large possibility that the control signals transmitted from a plurality of base stations can be received without interference. Therefore, when a plurality of base stations are located close to each other, there is then the small possibility that control signals from the respective base stations will interfere with each other. Thus, it is possible to reliably avoid the digital cordless telephone system from becoming useless as a cordless telephone.

In this case, of the control signals successively transmitted a plurality of times, the control signal of any one of the slots is not extinguished but constantly transmitted at a predetermined time interval, whereby the reference timing at which the control signal is received at the terminal station can be determined based on the timing at which the control signal is transmitted at the predetermined interval therefore, even when the transmission of the control signal is extinguished randomly, the terminal station can intermittently receive the control signal satisfactorily.

Having described preferred embodiments of the invention with reference to the accompanying drawings, it is to be understood that the invention is not limited to those precise embodiments and that various changes and modifications could be effected therein by one skilled in the art without departing from the scope of the invention as defined in the appended claims.

What is claimed is:

1. A base station of a digital cordless telephone system having a plurality of terminal stations and at least one other base station, comprising:

radio frequency processing means for processing an RF signal for transmitting and/or receiving digital data;

communication control means for controlling said radio frequency processing means to communicate with one or more of said plurality of terminal stations using a control channel, wherein said communication control means generates a control signal having periodic pulses for reception by said plurality of terminal stations, and wherein some of said periodic pulses are randomly extinguished; and random number generating means for generating random numbers used to select which of said periodic pulses are to be randomly extinguished, whereby periodic pulses from said base station will not simultaneously occur with periodic pulses from said at least one other base station when said selected periodic pulses are randomly extinguished.

2. A base station of a digital communication system as claimed in claim 1, wherein said communication control means generates a first control signal having first periodic pulses which are not randomly extinguished, and a second control signal having second periodic pulses, some of said second periodic pulses being randomly extinguished based on said random numbers generated by said random number generating means.

3. A base station of a digital communication system as claimed in claim 2, wherein said first and-second periodic pulses of said first and second control signals have equal periods.

4. A base station of a digital communication system as claimed in claim 1, wherein said communication control means generates a first control signal having first periodic pulses, some of which are randomly extinguished to form a first random sequence, and a second control signal having second periodic pulses, some of which are extinguished to form a second random sequence.

5. A base station of a digital communication system as claimed in claim 4, wherein said first and second periodic pulses of said first and second control signals have equal periods.

6. A base station of a digital communication system as claimed in claim 2, wherein said digital communication system uses one of a TDMA and a TDD signal format.

7. A base station of a digital communication system as claimed in claim 4, wherein said digital communication system uses one of a TDMA and a TDD signal formal.

8. A digital cordless telephone system comprising:

at least two base stations; and one or more terminal stations for receiving a digital signal, wherein communication between said at least two base stations and said one or more terminal stations uses respective control signals each having periodic pulses; and each of said at least two base stations having a random number generator, whereby some of said periodic pulses from each of said at least two base stations are randomly extinguished based on random numbers generated respectively from said random number generator, whereby periodic pulses from said at least two base stations will not occur simultaneously when said periodic pulses are respectively randomly extinguished.

9. A communication system as claimed in claim 8, wherein said control signal includes a first control signal having first periodic pulses which are not randomly extinguished and a second control signal having second periodic pulses which are randomly extinguished based on said random numbers.

10. A communication system as claimed in claim 8, wherein said control signal includes a first control signal having first periodic pulses which are randomly extinguished to form a first random sequence and a second control signal having second periodic pulses which are randomly extinguished to form a second random sequence.

11. A communication system as claimed in claim 8, wherein said communication system uses one of a TDMA and a TDD signal format.

12. A method for sending a control signal to any of a plurality of terminals from a base station of a digital cordless telephone system that includes at least one other base station, comprising the steps of:

generating a control signal having periodic pulses;

generating random numbers;

randomly extinguishing some of said periodic pulses based on the generated random numbers, whereby periodic pulses from said base station will not simultaneously occur with periodic pulses from said at least one other base station when said periodic pulses are randomly extinguished; and transmitting to any of said plurality of terminals an RF signal modulated by at least said control signal generated in said control signal generating step.

* * * * *